United States Patent [19]

Berger

[11] 4,072,319
[45] Feb. 7, 1978

[54] HAND TRUCK WITH RETRACTABLE FRAME

[75] Inventor: Henry D. Berger, Chicago, Ill.

[73] Assignee: Kimberly Rose Company, Inc., Chicago, Ill.

[21] Appl. No.: 678,245

[22] Filed: Apr. 19, 1976

[51] Int. Cl.² .............................................. B62B 3/00
[52] U.S. Cl. ............................. 280/47.37 R; 280/654; 280/47.24
[58] Field of Search ..................... 280/47.37, 654, 652, 280/655; 403/104; 16/115

[56] References Cited

U.S. PATENT DOCUMENTS

| 1,004,242 | 9/1911 | Chase | 403/104 |
|---|---|---|---|
| 3,168,330 | 2/1965 | Smith | 280/47.37 R |
| 3,827,707 | 8/1974 | Bierman | 280/654 |
| 3,947,054 | 3/1976 | Hall | 280/654 |

Primary Examiner—Robert R. Song
Attorney, Agent, or Firm—Laff, Whitesel & Rockman

[57] ABSTRACT

A hand truck provides sturdy use for home, travel and shopping. The hand truck has a two-part tubular frame which extends for use and slides together to a compact and retracted configuration for travel. When in its opened or extended position, the frame is secured by fittings that latch together. If a force is thereafter applied to move the frame and any load placed upon it, it will not slide together to a closed position, until the closing force exceeds the holding power of the latch. When the holding power of the latch is overcome, the tubular frame easily slides into its closed or retracted and compact position. The holding power of the latch is greater than the forces acting upon the latch which randomly occur during the normal operation of pulling the cart.

8 Claims, 6 Drawing Figures

HAND TRUCK WITH RETRACTABLE FRAME

This invention relates to hand trucks and utility carts and more particularly to sturdy, folding trucks and carts which are easily transportable (as with luggage) and extremely strong so that they may be used to transport substantial loads.

There are many times and places where hand trucks and utility carts may be used, such as in stores, homes, offices, and the like. In this usage, the hand trucks should be sturdy devices which are able to transport fairly heavy objects such as trash cans, boxes, cartons, luggage and the like. They should also be lightweight devices so that most of the human effort goes into the movement of the transported objects and not in the movement of the hand trucks or utility carts.

Another time and place where the described type of device may be used is in conjunction with long distance movement. Here, the device is folded in a closed position and attached to luggage as it is carried or moved on long trips. The problem is to close the hand truck into a compact unit which is small enough to carry along with the suitcases and yet opens into a unit which is large enough for comfortable utilization. The opening and closing of the device should be easily done so that a traveler with his arms full of coats, cameras, and the like is not required to perform difficult tasks. Preferably, he should be able to open and close the hand truck or utility cart with one hand and one foot.

The diameter of the wheels should be large enough so that they roll easily over uneven, rocky, or bumpy surfaces. Yet, the wheels should also be small enough so that they are not unduly bulky when the hand truck or utility cart is carried or shipped as part of the luggage.

These many requirements place conflicting demands upon the hand truck or utility carts. If they meet one requirement, they generally have failed to meet another.

An example of a hand truck or utility cart which is well adapted to meet the above-cited requirements is seen in British Pat. No. 1,357,157 published June 19, 1974 to Norland Gazelle (Travel Goods) Limited and entitled "Luggage Trolley". However, the device shown in this British patent has not always been as dependable as it might be since the sliding handle tended to slide together while in operation. Hence, the hand truck collapses into its closed position while being loaded before being put into use.

Accordingly, an object of the invention is to provide new and improved folding hand trucks and utility carts. Here, an object is to provide sturdy and rugged hand trucks having the strength required to transport relatively heavy loads. Also, an object is to provide such a truck which may, nevertheless, be closed to a compact configuration to travel with luggage.

Another object of the invention is to provide hand trucks and utility carts which may be opened and closed with one hand.

Still another object of the invention is to provide hand trucks and utility carts which will reliably remain in an open and operating configuration and will not collapse into a closed configuration while in operation.

In keeping with an aspect of this invention, these and other objects are accomplished by a hand truck or utility cart having a two-piece, tubular frame handle. When in its extended or open position, the frame parts are secured together by snap-lock devices, i.e., plastic fittings that come together and latch. If a closing or collapsing force is thereafter applied to the frame, it will not move to a closed position until the closing force exceeds the holding force of the latch. Once the latch's holding force is overcome, the frame closes into its retracted position. The holding force of the latch is greater than the collapsing forces randomly occuring during the normal operation of pulling the cart and less than the force which may be deliberately applied by a user of the hand truck to collapse the truck.

A preferred embodiment of the invention may be understood best from a study of the attached drawings, wherein.

Figure 1:
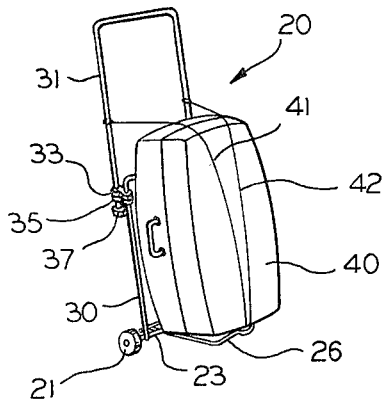
FIG. 1 is a perspective view of the inventive hand truck in a fully extended or open position, as it is being used to transport a suitcase, by way of example.
Figure 3:
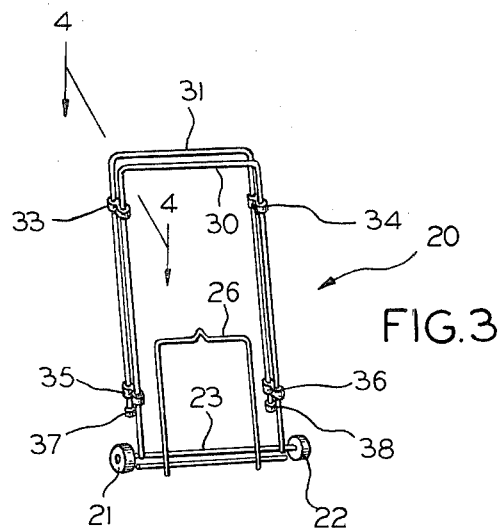
FIG. 3 is a plan view of the hand truck after it has been closed or retracted into a compact position.

The hand truck or utility cart 20 is supported on a pair of spaced wheels 21, 22 mounted on opposite ends of an axle 23. The axle length and wheel diameter are selected to give a stability to the truck 20 during its operation. Attached to the axle is a folding platform 26 which may fold down to a load carrying position (FIG. 2) or may fold up to a compact easily transportable position (FIG. 3). A bar 24 is welded to the back of the platform 26 to abut against the handle frame and thereby secure platform 26 in its extended position.

The two part, sliding frame and handle parts 30, 31 is also attached to the axle. Of course, there is no need to limit the handle to two parts, any convenient and suitable number of parts may be provided. The first frame part 30 is a generally U-shaped member which is attached to the axle in any suitable manner. The angle A, between the load-bearing position of platform 26 and the handle 30, is fixed by the bar 24 abutting against handle 31 so that a load supported by the platform may be lifted by tipping the handle back in the direction B.

The second frame part comprises a second U-shaped number 31 which is of the same width as the member 30 to fit behind and slide over it. For telescoping sliding adjacent each other, the members 30, 31 are joined together by two pair of fittings 33–36. The fittings 33, 34 are joined to the individual arms of lower member 30 and upper member 31 slides or telescopes through them. The fittings 35, 36 are joined to the individual arms of upper member 31, and the lower member 30 slides or telescopes through them. Each of the lower tips of member 31 is covered by a suitable cap 37, 38 which bears against member 30 to help support and stabilize the numbers 30, 31, relative to each other.

Figure 2:
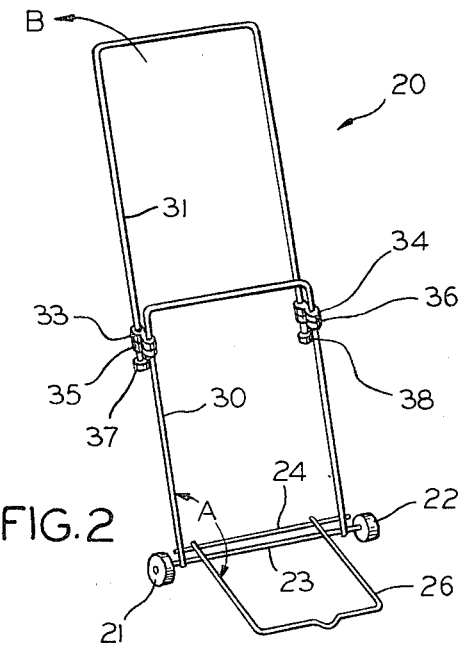
FIG. 2 is a perspective view of a hand truck also in an open or extended state, without a load.

The platform 26 may swing up and fit between the arms of the U-shape handle members 30 and 31. Member 31 may slide and telescope downwardly behind the U-shaped member 30, thereby forming a compact unit (FIG. 3) which may be carried along with luggage. Or, platform 26 may swing down and handle member 31 may telescope up and extend from the handle member 30 to form the open form (FIG. 2). In this form, the two arm members 30, 31 are joined together by fittings 33–36 and stabilized by the load bearing caps 37, 38. In the open form, any suitable load 40 may be rested on the platform 26 and fastened in place by elastic cables 41, 42 stretching from the outer end of platform 26 to upper handle 31. Any suitable hooks may be used to secure these elastic cables, when in place.

Figure 4:
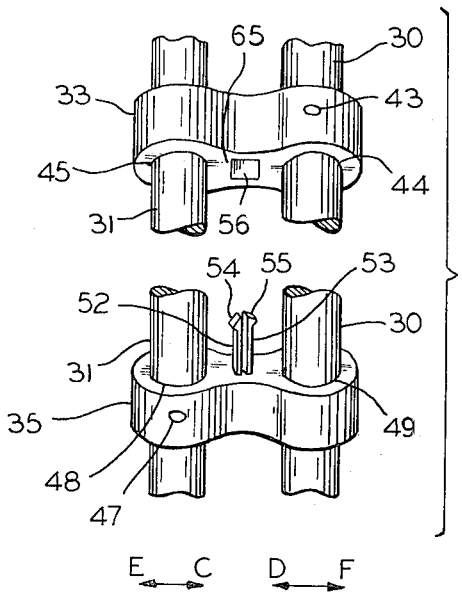
FIG. 4 is a perspective view of fittings used to enable an opening and latching of the handle, in an extended position.
Figure 6:
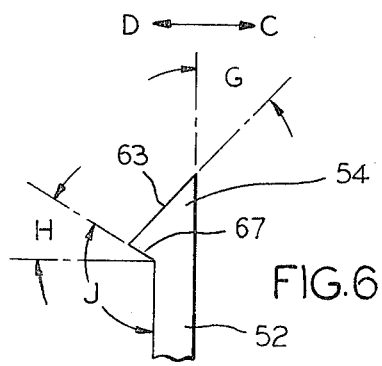
FIG. 6 is a plan view of the inventive latch configuration and contours.
Figure 5:
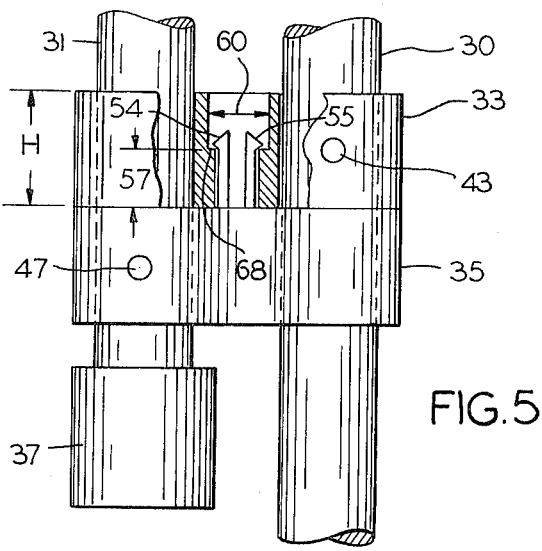
FIG. 5 is a plan view (partly in cross section) schematically showing the fittings in a latched position.

According to the invention, the fittings are constructed and formed as seen in FIGS. 4–6. Each fitting 33–36 is a piece part (preferably nylon) having a substantial height H and a cross section in the configuration of the numeral "8". The two handle members 30, 31 fit through corresponding eyes in the "8-shape". The lower member 30 is rigidly pinned at 43 or otherwise affixed to the fitting 33 at eye 44 of upper fitting 33, and upper handle 31 slides through eye 45 in fitting 33. Upper handle member 31 is pinned at 47, or otherwise affixed, to eye 48 of the lower fitting 35, and lower member 30 slides through eye 49 of fitting 35.

Upstanding on one of the fittings (here the lower fitting 35) is a pair of cantilevered springs 52, 53 having opposed latch forms 54, 55 on the unaffixed ends of the springs. Opposite latch forms 54, 55, a keeper hole 56 is formed in the other fitting 33. As the two handle members 30, 31 slide to an extended position, the cantilevered springs 52, 53 flex toward each other, in directions C, D (FIG. 5) when the latch enters the keeper 56.

The interior of the fitting having the keeper 56 is shaped, as seen in FIG. 5. Therefore, as the fittings 33–36 come together, the latch forms 54, 55 travel through a narrow neck region 57 and, at the extremity of the travel, encounter a wide cavity 60 where the springs 52, 53 flex apart, in directions E, F under the urging of their tension. As seen in FIG. 5, the latch forms 54, 55 enter into the wide part 60 of the cavity forming keeper 56 and secure the fixtures together. There the ends of latch forms 54, 55 hook over the walls of cavity 60 and hold the keeper by interference therewith. This latching prevents the handle members 30, 31 from sliding together to a closed position under forces which are likely to be encountered during normal operations.

To unlatch the handle members 30, 31, the user pushes down hard upon the handle 31. The forces acting upon the latch forms 54, 55 exceed the bias of springs 52, 53, and the handles can slide together.

FIG. 6 shows the details of the latch form 54 which enables the above-described operations. The leading end 63 of the latch form, which first enters the keeper 56, is formed at an angle G of about 45°. Therefore, the sloping top 63 of the latch form is, in effect, a cam surface which rides on edge 65 of keeper 56 (FIG. 4) for guiding, directing and forcing the spring 52 to flex in direction C as the latch form enters the keeper. The lower edge 67 of latch form 54 is formed with a second sloping surface having an angle H of about 30°. This surface 67 acts as a second cam, riding on edge 68 of the wide cavity 60 of keeper 56 for guiding, directing and forcing spring 52 to flex in direction C, to enable withdrawal of the latch form 54 from the keeper. The angle H is more acute than angle G so that the latch form is much easier to insert into than to remove from the keeper 56. The angle J is about 120°, which forms a hook that is sufficient to interconnect the two fittings 33, 35.

Those who are skilled in the art will readily perceive how various changes and modification may be made. Therefore, the appended claims are to be construed broadly enough to cover all equivalents falling within the true scope and spirit of the invention.

I claim:

1. A hand truck having a pair of frame members which slide together or apart relative to each other so that they may be moved between extended and retracted positions, said pair of members comprising two separate, U-shaped members positioned in a front to back relationship, two pairs of fitting means for slidingly joining opposing arms of the pair of U-shaped members, and latch means on each pair of said fitting means for releasably securing together that pair and therefore the pair of U-shaped members when extended apart, said latch means both latching and unlatching responsive to forces applied directly to the frame to extend or retract the U-shaped members.

2. The hand truck of claim 1 wherein the four fitting means forming the two pairs are arranged with each pair of said fittings being on an individually associated side of said U-shape, a first of each pair of said fitting means being fixed to an individually associated one of the arms of one of the U-shaped members, the arms of the other of said U-shaped members sliding through said first fitting means of each pair, a second of each pair of said fitting means being fixed to an individually associated one of the arms of the other of the U-shaped members, the arms of said one U-shaped member sliding through said other fitting means of each pair.

3. The hand truck of claim 2 wherein each of the first fitting means of each pair has at least one upstanding cantilever spring mounted on the side of the fitting which approaches and snaps into the second fitting as said U-shaped members slide toward their extended positions.

4. A hand truck having a pair of frame members which slide together or apart relative to each other so that they may be moved between extended and retracted positions, said pair of members comprising two separate, U-shaped members positioned in a front to back relationship, two pairs of fitting means for slidingly joining opposing arms of the pair of U-shaped members, the four fitting means forming the two pairs being arranged with each pair of said fittings on an individually associated side of said U-shape, a first of each pair of said fitting means being fixed to an individually associated one of the arms of one of the U-shaped members, the arms of the other of said U-shaped members sliding through said first fitting means of each pair, of second of each pair of said fitting means being fixed to an individually associated one of the arms of the other of the U-shaped members, the arms of said one U-shaped member sliding through said other fitting means of each pair, latch means on each pair of said fitting means for releasably securing together that pair and therefore the pair of U-shaped members when extended apart, said latch means comprising at least one upstanding cantilever spring mounted on each of the first fitting means of each pair on the side of the fitting which approaches the second fitting as said U-shaped members slide toward their extended positions, the unsupported end of each cantilevered spring having a latch form thereon, and the second of the fittings having a keeper notch with a cavity for capturing said latch form.

5. The hand truck of claim 4 wherein the end of said latch form which first enters said keeper has a slanting tip surface for guiding and directing said latch form into a capture position within said keeper.

6. The hand truck of claim 5 wherein the end of said latch form which first leaves said keeper notch has a second slanting surface for guiding and directing said latch form into a released position outside of said keeper, said slanting surface at said tip being an angle which is more acute than the angle of the second slanting surface, whereby it is much easier to insert the latch into than it is to remove the latch from the keeper.

7. The hand truck of claim 6 wherein there are two of said cantilevered springs, each having a latch form on the extreme end thereof, with the two latch forms oriented in mutually opposed directions.

8. The hand truck of claim 4 wherein there are two of said cantilevered springs, each having a latch form on the extreme end thereof, with the two latch forms oriented in mutually opposed directions.

* * * * *

UNITED STATES PATENT AND TRADEMARK OFFICE
CERTIFICATE OF CORRECTION

PATENT NO. : 4,072,319
DATED : February 7, 1978
INVENTOR(S) : HENRY D. BERGER

It is certified that error appears in the above-identified patent and that said Letters Patent are hereby corrected as shown below:

Column 2, line 5, after "frame" should be --easily--

Column 3, line 61, before "angle" should be --the--

Column 4, line 49, "of second" should be --a second--

Signed and Sealed this

Twentieth Day of June 1978

[SEAL]

Attest:

RUTH C. MASON
Attesting Officer

DONALD W. BANNER
Commissioner of Patents and Trademarks